(12) United States Patent
Bellante (10) Patent No.: US 10,214,307 B2
(45) Date of Patent: Feb. 26, 2019

(54) SUPPORTING STRUCTURE FOR PACKAGING MACHINES

(71) Applicant: CAMA1 S.p.A., Milan (IT)

(72) Inventor: Daniele Bellante, Garbagnate Monastero (IT)

(73) Assignee: CAMA1 S.P.A., Milan (IT)

( * ) Notice: Subject to any disclaimer, the term of this patent is extended or adjusted under 35 U.S.C. 154(b) by 318 days.

(21) Appl. No.: 15/145,571

(22) Filed: May 3, 2016

(65) Prior Publication Data

US 2016/0368647 A1 Dec. 22, 2016

(30) Foreign Application Priority Data

Jun. 17, 2015 (EP) .................................. 15172466
Mar. 23, 2016 (EP) .................................. 16161824

(51) Int. Cl.
| | | |
|---|---|---|
| *B65B 65/00* | (2006.01) | |
| *F16M 1/00* | (2006.01) | |
| *F16L 3/02* | (2006.01) | |
| *B65B 59/04* | (2006.01) | |
| *B65B 19/34* | (2006.01) | |

(52) U.S. Cl.
CPC ............ *B65B 65/003* (2013.01); *B65B 19/34* (2013.01); *B65B 59/04* (2013.01); *F16L 3/02* (2013.01); *F16M 1/00* (2013.01); *B65B 2210/06* (2013.01)

(58) Field of Classification Search
CPC ....... B65B 65/003; B65B 59/04; B65B 19/34; B65B 2210/06; B65B 59/00; B65B 65/00; B65B 2210/00; F16L 3/00; F16L 3/04; F16L 3/06; F16L 3/08; F16L 3/02; F16M 1/00; F16M 7/00; F16M 11/00
See application file for complete search history.

(56) References Cited

U.S. PATENT DOCUMENTS

| | | | | |
|---|---|---|---|---|
| 5,848,500 | A * | 12/1998 | Kirk ...................... | E04B 1/5831 52/79.1 |
| 7,726,097 | B2 * | 6/2010 | Ehrmann .................. | B65B 9/04 198/860.1 |
| 8,186,634 | B2 * | 5/2012 | Chen ..................... | H02G 3/0456 248/298.1 |
| 8,240,619 | B2 * | 8/2012 | Nikayin ................ | F16L 3/1218 248/58 |

FOREIGN PATENT DOCUMENTS

| | | |
|---|---|---|
| DE | 10147361 | 4/2003 |
| DE | 102006006220 | 8/2007 |
| EP | 2298653 | 3/2011 |

OTHER PUBLICATIONS

European Search Report from European Patent Application No. EP 15172466 dated Nov. 3, 2015.

* cited by examiner

*Primary Examiner* — David Walczak
(74) *Attorney, Agent, or Firm* — Dorsey & Whitney LLP (57) ABSTRACT

A module structure for a packaging machine comprising vertical members and horizontal beams, including horizontal beams configured as open beams, having an open polygonal cross section and comprising at least a first end face, a second end face, one or more intermediate faces between said first and second end faces, said end faces being distanced in such a way to leave a longitudinal aperture of the beam; said open beams may include reinforcing flanges and accommodate power/signal cables.

12 Claims, 8 Drawing Sheets

SUPPORTING STRUCTURE FOR PACKAGING MACHINES

CROSS-REFERENCE TO RELATED APPLICATIONS

This application claims priority to European Patent Application No. 15172466.3 filed on 17 Jun. 2015 and European Patent Application No. 16161824.4 filed on 23 Mar. 2016, the disclosure of each of the foregoing applications is incorporated herein, in its entirety, by this reference.

TECHNICAL FIELD

Embodiments of the invention relate to the field of packaging machines. In particular, embodiments of the invention relate to a structure for a packaging machine.

BACKGROUND

A packaging machine includes a frame structure to support components such as conveyors, handling devices like robots and manipulators, motors, actuators and the like, as well as power and signal connections. The modern packaging machines make intensive use of so-called mechatronic units which combine advanced mechanics and electronics system; in addition, a packaging machine usually comprises pneumatic units, for example vacuum operated picking devices, and a number of sensors to detect the position of articles and other parameters. Hence a large number of electric and pneumatic cables are required and must be properly arranged.

The early generation of packaging machines included a frame structure designed specifically for a given application. The structure was usually designed around full-length longitudinal beams or a platform corresponding to the footprint of the machine. This kind of structure was highly specific and provided little or no flexibility; further drawbacks were the relevant cost and weight.

Said structures have evolved into modular supporting frames following a demand of diverse and highly customized packaging machines. Some manufacturers have developed modular frame systems wherein the structure of a packaging machine is composed of a limited number of basic frame modules. A frame module comprises for example a base element and a number of upright and crossbeams made of tubular members, and the inside of said tubular members is used to carry electric and pneumatic cables.

This modular approach is widely used but leaves some problems open. The modules are generally designed around certain basic features of the machine, hence the possibility to configure the structure according to customer specifications is still limited. For example a modular structure realized for a robotic machine would be unsuitable to realize a simpler and less expensive conventional machine.

The increasing number of electric and pneumatic links poses also the problem of seeking a suitable layout of cables to minimize costs and increase reliability. A further and emerging requirement is the need of a so-called hygienic design, that is a design to facilitate cleaning and reduce the risk of contamination. A hygienic design is important especially when the machine operates in a controlled environment, for example in the food or pharma industry, and a periodic cleaning and sanitization is required. Furthermore, the structure must be safe and reduce the risks of accidents.

For all the above reasons, there is still the need to improve the existing frame structures of packaging machines.

DE 101 47 361 discloses a packaging unit comprising two longitudinal rails with columns and connecting beams containing the services for a robot. EP 2 298 653 discloses a module for a packaging train.

SUMMARY

The object of one or more embodiments of the invention is to provide a frame structure for a packaging machine overcoming the drawbacks of the prior art.

One or more embodiments of the invention aim in particular to provide: a high flexibility and adaptability to different types of machine, including conventional machines and robotized machines; a modular concept based on a limited number of basic members; advanced integration of mechanical, electronic and pneumatic systems; easy cleaning and sanitization.

The above aim is reached with a module structure for a packaging machine comprising vertical members and horizontal beams, characterized in that said horizontal beams is an open beam having an open polygonal cross section and comprising at least a first end face, a second end face, one or more intermediate faces between said first and second end faces, said end faces being distanced in such a way to leave a longitudinal aperture of the beam.

Preferably, the majority or all of the horizontal beams of the module structure are realized with the abovementioned open polygonal cross section. In some embodiments however the horizontal beams of the structure may comprise also conventional beams, if appropriate.

In some embodiments said open beams have a cross section which is substantially C-shaped. In a preferred embodiment, said open beam(s) have a substantially diamond-like cross section, more preferably with four to six sides in a polygonal arrangement.

Preferably each one of the open beams is oriented in such a way that no face of the beam is horizontal.

In a preferred embodiment, said open beams comprise a plurality of internal reinforcing flanges. Each beam may include several reinforcing flanges, which are preferably spaced in an even manner.

Said reinforcing flanges have preferably a closed frame structure, leaving a central passage which is available e.g. for cables. In a more preferred embodiment, said frame-like reinforcing flanges comprise a first plurality of sides, wherein each of said sides is parallel to a corresponding side of the beam, and at least another side across the open slot of the beam. One or more side(s) of the flange can also be curvilinear according to some embodiments. According to this embodiment, the flanges follow the shape and profile of the beam and provide a local reinforcement against stress thanks to their closed cross section.

Said reinforcing flanges may comprise seats for accommodation of cables. Said seats can be embodied as arc-shaped recesses of an inner face of at least one side of the flange. In a more preferred embodiment, said reinforcing flanges comprise inward projections which define spaces for accommodation of cables. Preferably said projections are arranged in one or more groups of parallel projections, each group forming a comb-like structure for accommodation of cables.

Said open beams may also comprise end flanges for fixation to vertical elements of the structure, for example for fixation to corner elements and cabinets of the structure.

Said vertical members and horizontal beams form preferably a lattice structure.

The structure typically comprises a network of cables for distribution of power and signals. Said power/signal distribution network may include any of: electric power cables; signal cables; pneumatic cables feeding compressed air and/or vacuum. The term "cables" is used herein to denote cables adapted to carry any of electric power, electric signals or a fluid.

In a preferred embodiment, said cables are arranged in the open beams of the structure.

In some embodiments, the vertical members include cabinets containing pneumatic and/or electrical components of the packaging machine. More preferably, the beams hosting said cables form one or more horizontal layer(s), in such a way that the resulting power and signal distribution network is arranged on one or more horizontal layer(s). For example the cables may interface with suitable inputs/outputs of cabinets containing the electric and/or pneumatic equipment. In a preferred embodiment, the power/signal distribution network is arranged exclusively on one or more horizontal layers and any vertical member other than the cabinets, if provided, does not host any cables. For example, in a preferred embodiment, the cables are arranged on a floor level and on a top level of the structure.

The structure may comprise fixed beams and adjustable beams. According to an embodiment, the above defined open beams are fixed structural beam which are in a fixed position. The adjustable beams may include one or more cross beams which can be removably arranged in different positions relative to two parallel fixed beams (guide beams). In some embodiments the structure includes at least an upper pair of parallel longitudinal beams and a lower pair of parallel longitudinal beams; the adjustable beams include cross beams which can be reversibly arranged in a number of positions between said upper pair or between said lower pair of longitudinal parallel beams. The structure may also comprise fixed cross beams.

In some embodiments the structure comprises vertical corner members arranged at the corners of the structure and at least some of said corner members are represented by cabinets adapted to contain pneumatic and/or electrical components of the packaging machine.

The corner members can provide both a structural function and accommodation of the main electric, electronic and pneumatic components. The different cables (power, signal, pressure or vacuum) can be distributed to/from said cabinets and through the above described open beams.

A further aspect of the invention is a module structure for a packaging machine comprising vertical corner members arranged at the corners of the structure and a plurality of beams, characterized in that:

at least some of said corner members are represented by cabinets adapted to contain pneumatic and/or electrical components of the packaging machine;

and in that said structural beams comprise:

a first set of structural beams in a fixed position and a second set of beams having an adjustable position, the first set includes at least an upper pair and a lower pair of parallel longitudinal beams, and the second set includes cross beams which can be removably arranged in different positions between said upper pair or lower pair of longitudinal parallel beams.

wherein the fixed beams of said first set have the above mentioned open polygonal cross section, thus comprising: a first end face, a second end face, one or more intermediate faces, an open slot between said first end face and second end face.

Said first set of fixed beams may include any of the above mentioned preferred features of the open beams. The fixed beams of the first set are preferably used to provide passages for signal and power cables Preferably, said first set of fixed beams includes at least an upper pair of parallel longitudinal beams and a lower pair of parallel longitudinal beams; the second set of adjustable beams includes cross beams which can be reversibly arranged in a number of positions between said upper pair or lower pair of longitudinal parallel beams. The structure may also comprise fixed cross beams.

The position of the adjustable beams can be varied continuously within a certain range or in discrete predetermined positions, according to different embodiments. The longitudinal guide beams for example may comprise a slot or a set of fixation holes for the adjustable cross beams. The adjustable cross beams can be positioned relative to two parallel longitudinal guide beams and fixed with removable means such as screws or bolts.

In a preferred embodiment, the adjustable cross beams have wedge-shaped ends matching corresponding inclined faces of the respective longitudinal guide beams, to facilitate the assembly and provide a more rigid structure.

According to a further preferred feature of an embodiment of the invention, at least the longitudinal beams of the structure comprise a prismatic connection member suitable for insertion of further transversal beams for coupling the structure with another one. This provides a further modularity of the structure wherein two or more modules can be combined.

The structure of an embodiment of the invention can be used to realize a standard module including four corner members, top and bottom longitudinal beams, and a number of cross beams. Said standard module may have a fixed height and width (e.g. 2 meters) and a variable length according to the length of the longitudinal beams, possibly with intermediate columns. Advantageously, a single module can be used to realize a machine for a certain task, for example a case packer; two or more of said modules can be aligned to form a more sophisticated packaging line; modules can also be placed side by side when necessary.

An aspect of the invention is also a packaging machine or a packaging line, in particular for secondary packaging of articles into containers, comprising one or more module(s) according to any of the various embodiments of the invention.

One or more embodiments of the invention has, among others, the following advantages.

The open cross section of the beams provides easy and efficient cleaning and sanitization of the packaging machine. The open slot provides easy and fact access to the inner side of the beams and the lack of horizontal surfaces reduces the accumulation of dirt or foreign matter, and facilitates its removal.

The reinforcing flanges improve resistance of the open beam to stress, especially bending and/or torsional stress, since the cross section of the beam is closed in correspondence of the flange. The end flanges, provided at the opposite ends of the beam, can provide easy fixation and removal to the vertical members and/or to the cabinets at the corner of the structure.

The passage of cables can be fully integrated in the beams of the structure. The reinforcing flanges of the open beams can be designed to accommodate power and signal cables without the need of fixing means such as clamps, which is still a further advantage in terms of fast and accurate cleaning.

In this respect, the embodiments with inward projections of the reinforcing flanges are of particular advantage since they provide a well-defined and firm support for cables. The cables can be secured with a limited number of fixation means which means they can be easily removed and re-positioned during periodic cleaning. In the prior art, in contrast, the cables are usually fixed with several fixation clamps (or equivalent means); they can be temporarily removed during the cleaning of the machine but their removal requires to break all the numerous fixation clamps and, after cleaning is performed, to put in place another full set of replacement clamps, which is a time-consuming task.

A further advantage of an embodiment of the invention is given by electrical and pneumatic components highly integrated in the structure. A power/signal distribution network can be arranged on horizontal layers and substantially without vertical passages. In accordance, the electric or pneumatic power and signals can be distributed to desired locations of the structure in a safe and highly configurable way. Furthermore, no cable or very few cables remains exposed. Flying cables might accumulate dirt or soil and, hence, their integration into the structure is an advantage from the hygienic point of view.

It can be appreciated that an embodiment of the invention achieves a true hygienic design. Sanitization is becoming a crucial requirement for a packaging machine, especially (but not limited to) food and pharma applications. A design oriented to making sanitization easier and more efficient is then a decisive advantage.

It should also be appreciated that an embodiment of the invention provides a general-purpose modular structure which is based on a limited number of basic components but, nevertheless, can be used to realize virtually any packaging machine.

For example the power and signal are distributed by the open beams in such a way that any user (e.g. a robot or manipulator or a pneumatic-actuated device) can be mounted in any location of the machine, the required connections being readily available. The adjustable cross beams provide a further means to customize the machine, in particular to properly support devices such as a robot, a manipulator or the like.

The features and advantages of embodiments of the invention will emerge clearly with the aid of the detailed description, provided by way of a non-limiting example, with reference to the accompanying drawings.

DETAILED DESCRIPTION OF PREFERRED EMBODIMENTS

Figure 1:
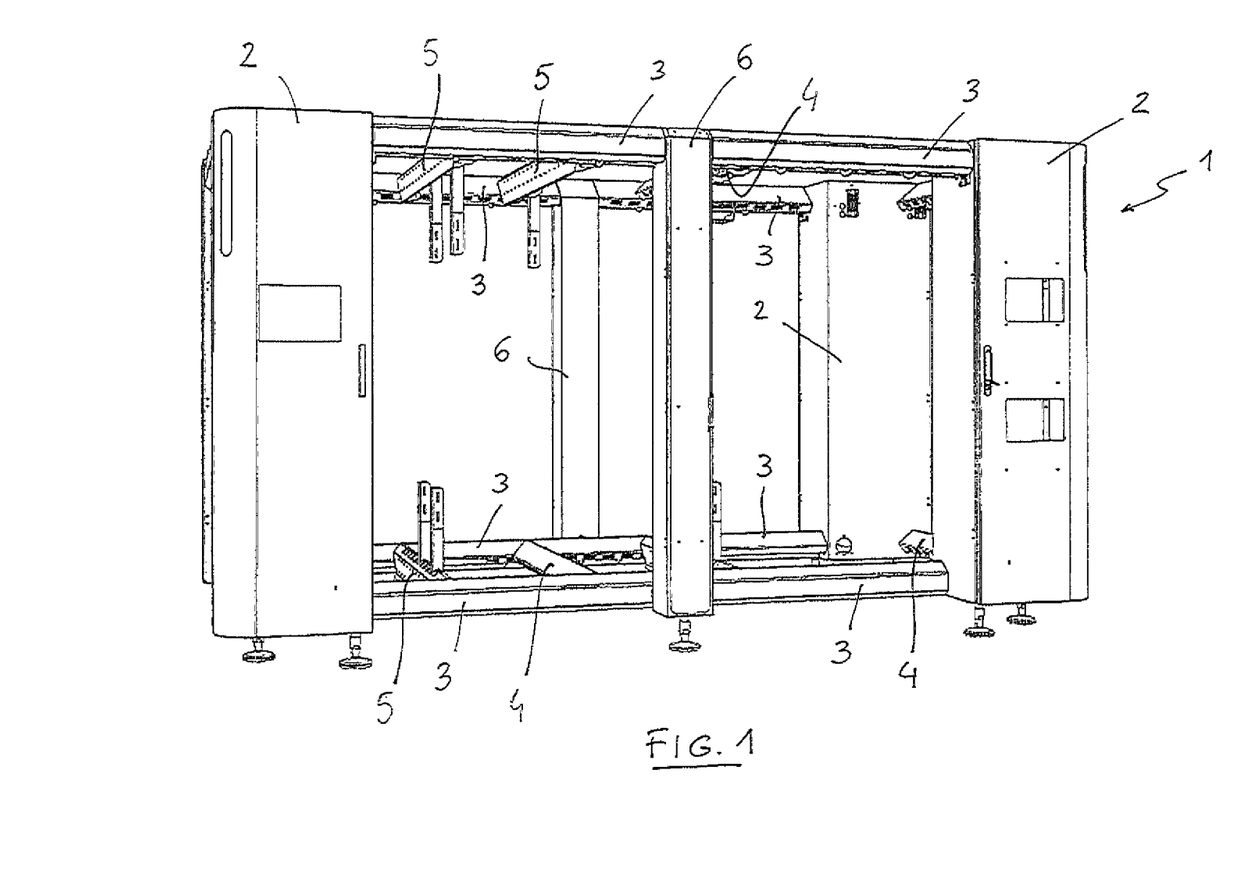
FIG. 1 is a view of a module of structure for a packaging machine according to an embodiment of the invention.
Figure 2:
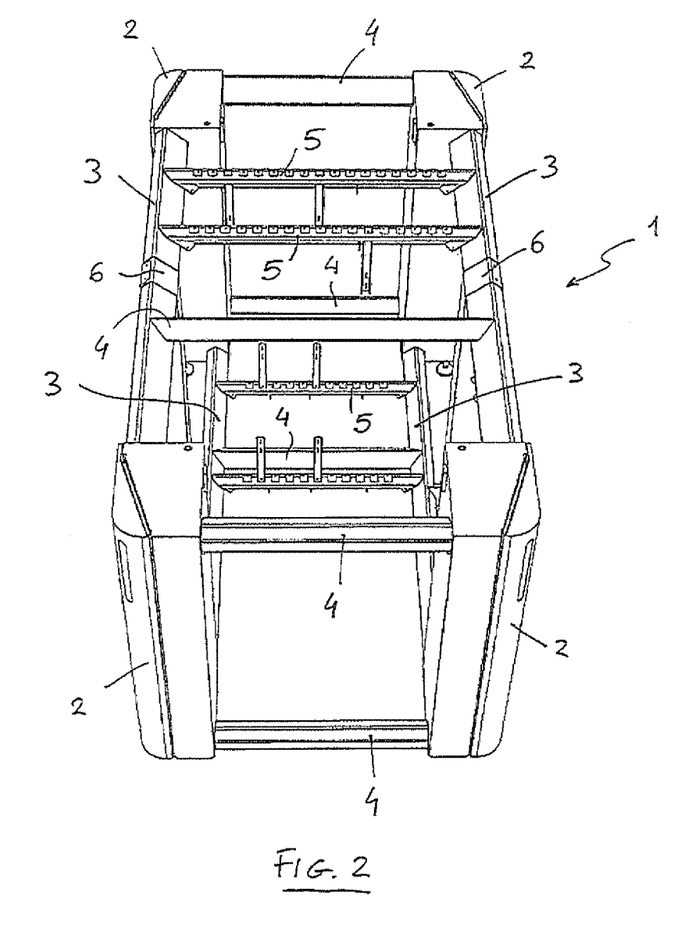
FIG. 2 is another view of the structure of FIG. 1.

FIGS. 1 and 2 show a module of structure 1 for a packaging machine comprising vertical cabinets 2 and a number of longitudinal beams and cross beams. The vertical cabinets 2 are arranged at the corners of the structure 1.

The structure includes upper and lower longitudinal beams 3; first cross beams 4 which are in a fixed position, and second cross beams 5 having an adjustable position.

The cabinets 2 can be regarded as supporting corner members of the structure 1. Said cabinets 2 contain electronic and/or pneumatic components such as motor, vacuum pumps, etc. and the electronics which governs the packaging machine (e.g. a programmable logic).

The structure 1 may comprise further vertical elements 6 in intermediate positions between the cabinets 2. Said vertical elements provide a support for protective screens (not shown).

The adjustable beams 5 can slide on two parallel longitudinal fixed beams 3 acting as guides. The position of the adjustable beams 5 relative to the respective guide beams can be determined according to the specific requirements and can be secured with suitable means such as screws or bolts.

Figures 3, 4:
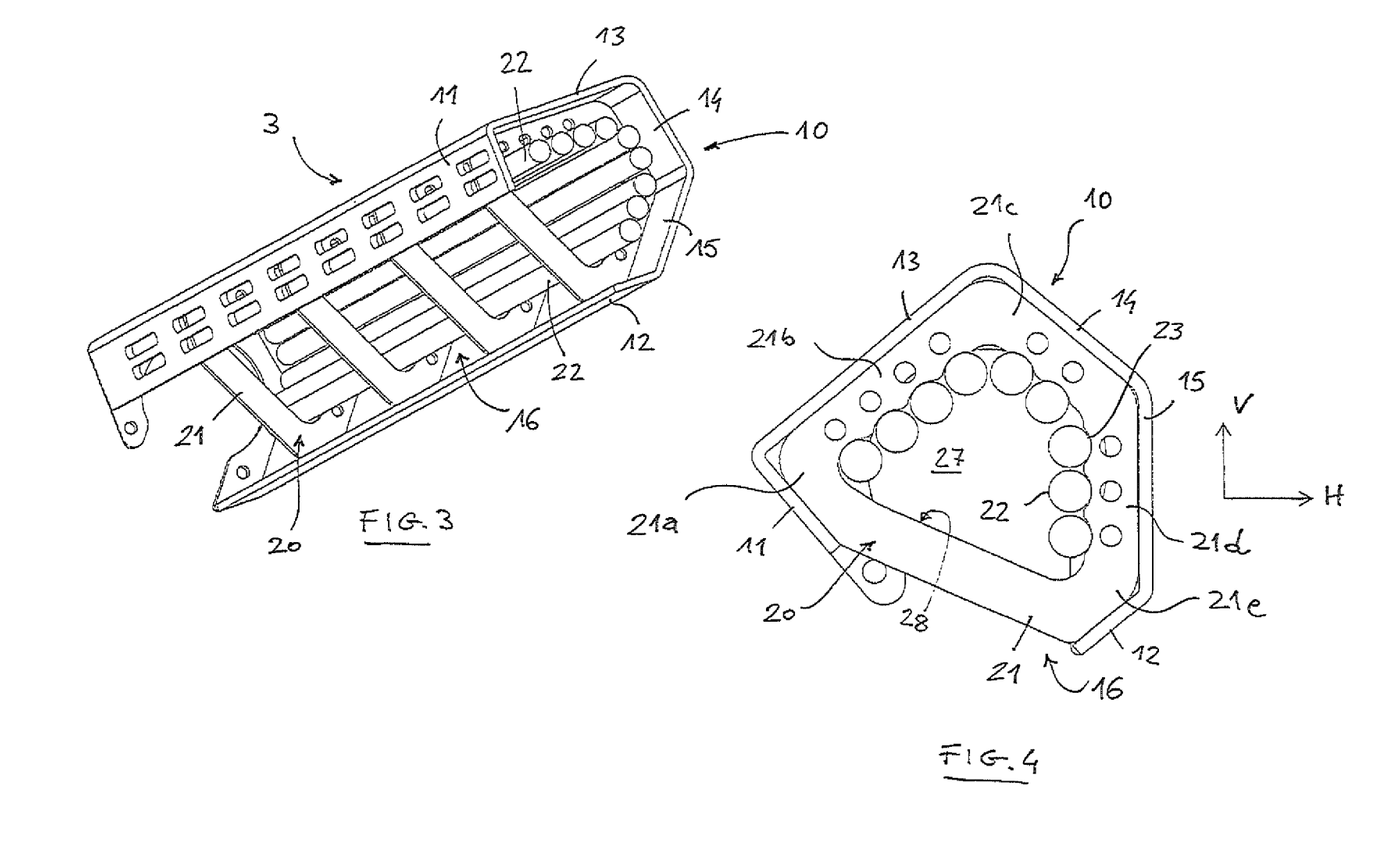
FIG. 3 illustrates a first embodiment of the structural beams.
FIG. 4 illustrates a cross section of the beam of FIG. 3.

FIG. 3 illustrates a preferred embodiment of fixed beams 3 or 4. More in detail, FIG. 3 illustrates a longitudinal beam 3 having an open polygonal cross section 10 which comprise a first end face 11, a second end face 12 and intermediate faces 13, 14 and 15. The end faces 11 and 12 are distanced to leave an open slot 16.

Preferably the arrangement in space of the beam 3 is such that no one of said faces 11 to 15 is horizontal. FIG. 4 shows a preferred arrangement of the beam 3 relative to the vertical direction V and horizontal direction H wherein no one of faces 11 to 15 is parallel to the horizontal direction H. It can be appreciated from said FIG. 3 that cleaning and removal of dust or any foreign matters is greatly facilitated by the aperture of slot 16, allowing easy access to the inside of the beam 3, and by the absence of horizontal surfaces.

The beam 3 preferably comprises a number of internal reinforcing flanges 20. The flanges 20 are fixed, for example welded, to the inside of the beam 3.

Each flange 20 in a preferred embodiment is substantially a thin-walled frame element having a closed cross section. Hence the open section of the beam 3 is locally closed by the flanges 20, to the advantage of the rigidity and resistance to stress, especially to bending and/or torsional stress.

In a preferred embodiment, the flanges 20 comprise one or more sides parallel to the faces of the beam 3, for example the flange of FIG. 4 has sides 21*a* to 21*e* parallel to faces 11 to 15, respectively. The flange 20 has at least another side 21 traversing the slot 16 to close the section. Hence the flange 20 follows the open section of the beam 3 which is then closed by the side 21.

Figures 5, 6, 7:
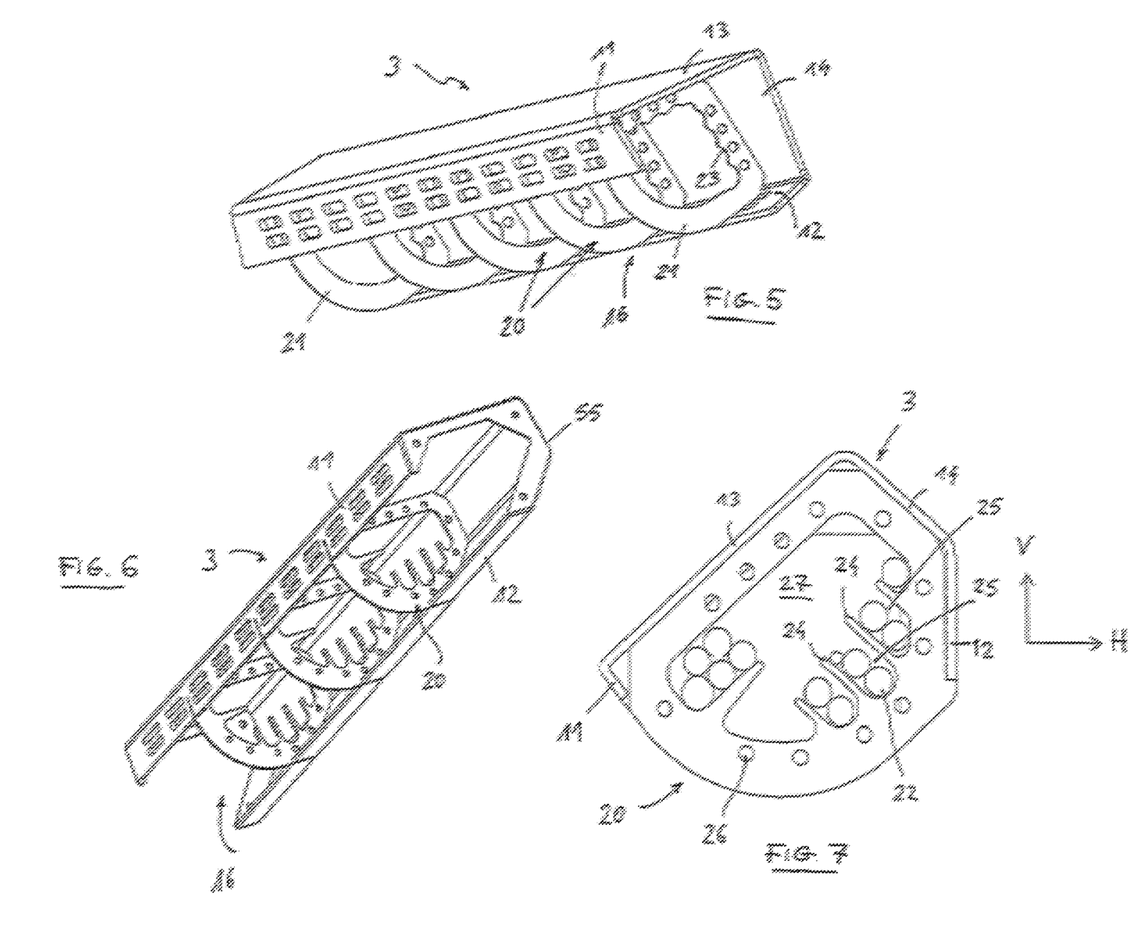
FIG. 5 illustrates a second embodiment of structural beams.
FIG. 6 illustrates a third embodiment of structural beams.
FIG. 7 illustrates a cross section of the beam of FIG. 6.

FIGS. 5 to 7 show a second embodiment where the slot closing side 21 of the flanges 20 is curvilinear. In this embodiment the beam 3 is four-sided including sides 11, 12 around the open slot 16 and intermediate sides 13, 14.

The beams 3, 4 can accommodate cables 22 of a power/signal distribution network. In most cases, said cables 22 comprise electric cables for power/signal connections and pneumatic cables to feed compressed air or vacuum. The cables 22 pass through a central passage 27 of the flanges 20 (FIGS. 4 and 7). In a preferred embodiment the flanges 20 comprises seats 23 to receive and retain the cables 22 in a stable position.

In the embodiments of FIGS. 3 to 5 the cable seats 23 are in the form of rounded recesses of the inner surface(s) 28 of one or more side(s) of the flanges 20.

FIGS. 6 and 7 show a third embodiment of structural beams and related reinforcing flanges 20, wherein the flanges 20 comprises inward projections 24 to define spaces 25 for accommodation of cables 22. Preferably each flange 20 has a plurality of parallel projections 24 in a comb-like arrangement so that several spaces 25 are obtained. The structural beam of FIG. 6 also shows end flanges 55 for fixation to vertical elements of the structure, for example for fixation to corner elements and cabinets of the structure.

An advantage of this embodiment is that cables 22 are ordered and safely received in the spaces 25 with a reduced need of fixing means such as fixing clamps or the like, the cables 22 being safely held in position by the projections 24. The advantage is considerable because a more hygienic design is achieved; the cables 22 can be easily removed and re-positioned during periodic cleaning.

One or more embodiments of the invention provide that the use of fixation clamps is reduced or eliminated. Nevertheless, some holes 26 for fixation clamps may be provided in the flanges 20. Fixation clamps of the cables 22 may be advantageously placed at the ends of the beam 3, 4.

The polygonal cross section of the open beams may be U-shaped or C-shaped or have a more elaborate shape. The figures show a preferred embodiment where the open beams have a substantially diamond shape.

Embodiments of FIGS. 3 to 7 can be equally applied to the longitudinal beams or cross beams of the structure 1.

The corner cabinets 2 (FIG. 8) have preferably upper and lower outputs 30, 31 for said cables 22, corresponding to the level (height) of the fixed beams 3 and 4. Hence a network of cables 22 running through the fixed beams 3, 4 can be arranged substantially on horizontal layers, for example on a top level and floor level of the structure and without the need of cables crossing the structure in the vertical direction. The inputs and outputs, as well as any passage from one layer to another, is provided by the cabinets 2.

Figure 8:
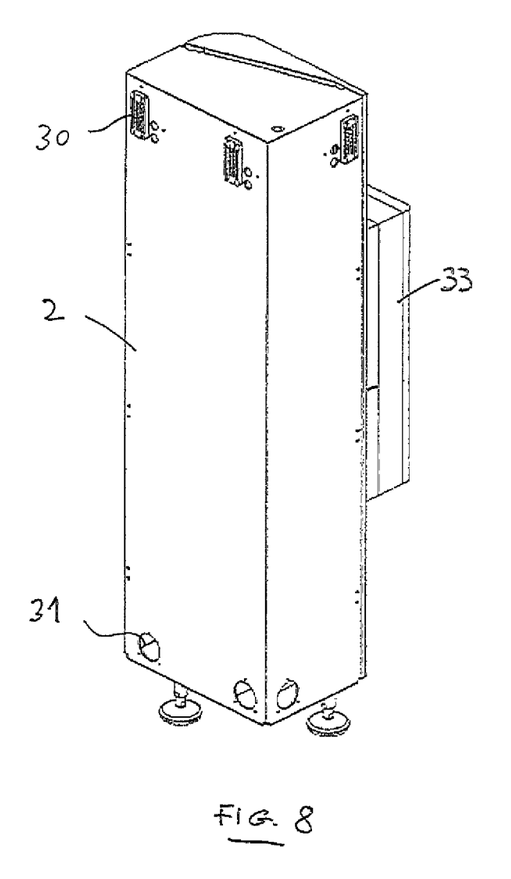
FIG. 8 illustrates one of the corner members of the structure of FIG. 1.

Accordingly, the structure can be implemented with all cable connections through the cabinets 2 and any additional vertical element, like for example the elements 6, contains no cables. This arrangement of the cables 22 is safer and easier to implement and eliminates flying connections which are less reliable and less hygienic.

FIG. 8 shows also a control panel 33 integrated in the cabinet 2.

Figure 9:
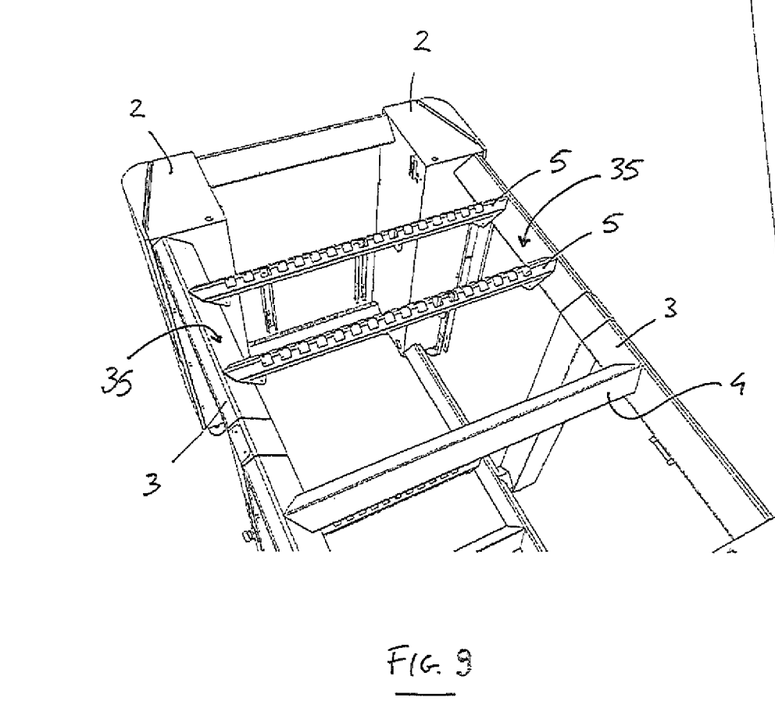
FIG. 9 is a view of the top of the structure of FIG. 1.
Figure 10:
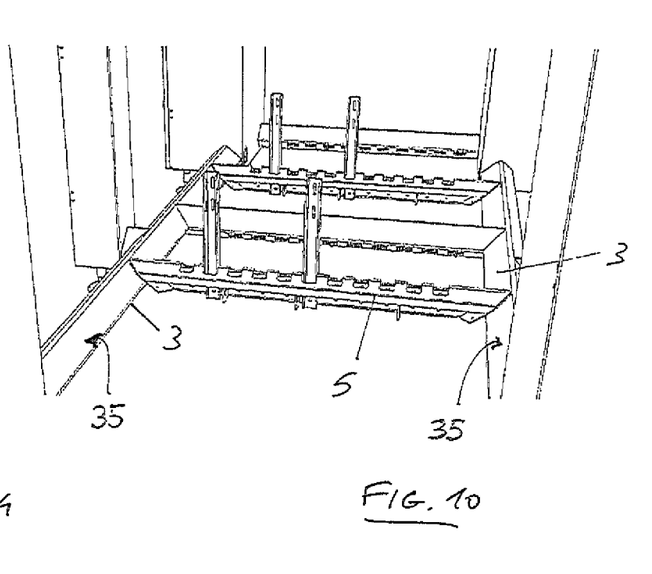
FIG. 10 is a view of the floor region of the structure of FIG. 1.
Figure 11:
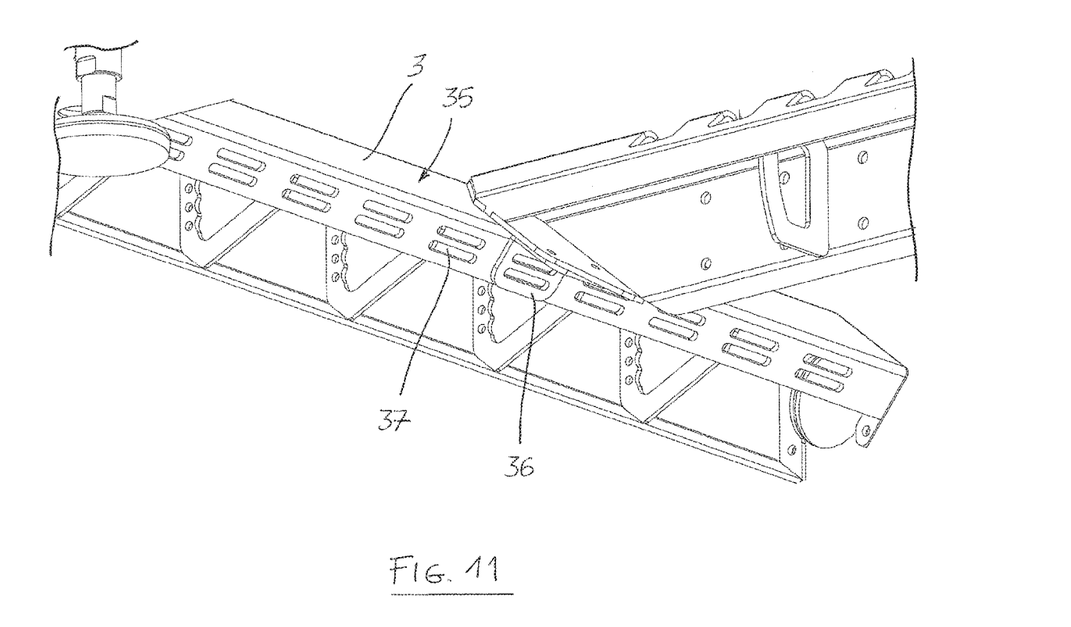
FIG. 11 is a detail of a preferred embodiment for connection of adjustable beams of the structure.

FIGS. 9 to 11 show some details of a preferred embodiment of adjustable cross beams 5 having wedge-shaped ends matching corresponding inclined faces 35 of the respective longitudinal guide beams 3.

FIG. 11 shows an embodiment of fixation of an adjustable beam 5, which is anchored to a selected one of holes 37 of the guide beam 3 via a suitable connection means, for example L-shaped block 36; said block 36 is secured to the guide beam 3 by suitable means such as screw(s) or bolt(s) (not shown). In accordance, the adjustable beam 5 can be arranged in a multitude of positions defined by said holes 37.

Figure 12:
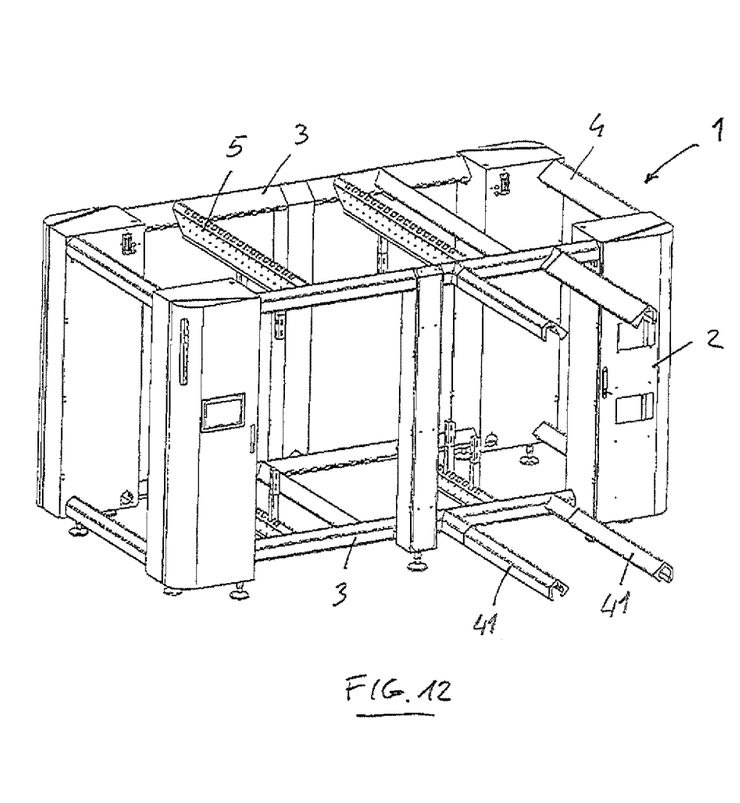
FIGS. 12, 13 relate to an embodiment of the invention which provides connection between two module structures.
Figure 13:
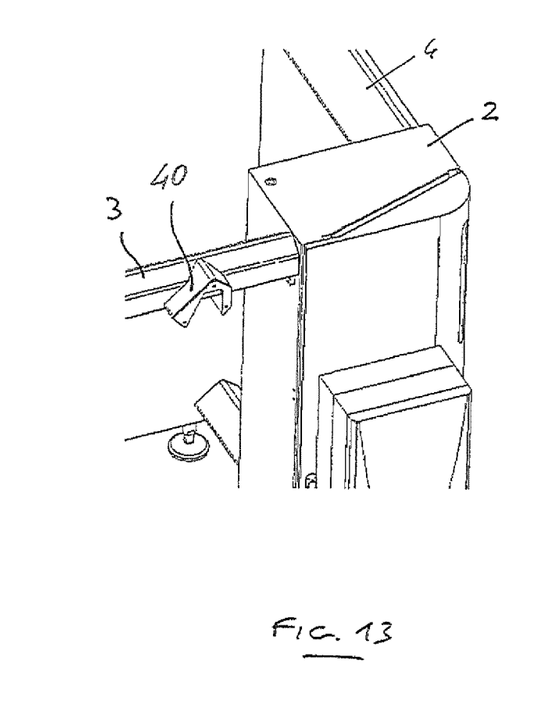

FIGS. 12 and 13 illustrate a further embodiment of the invention, wherein the longitudinal beams 3 comprise prismatic connection members 40 suitable for insertion of further transversal beams 41 to connect the structure 1 to another similar or identical structure. The shape of the connection members 40 matches the cross section of the beams 41 so that a beam 41 can be coupled to the connection member.

Hence the structure 1 can be regarded as a module which is connected to other modules to form a large structure, for example of a complex packaging line. Each structure/module 1 can be customized to host specific devices and to perform a specific task such as carton forming, product loading or another.

The invention claimed is:

1. A module structure for a packaging machine, the modular structure comprising:
   vertical members; and
   horizontal beams, said horizontal beams configured as open beams having an open polygonal cross section, said horizontal beams including:
      at least a first end face;
      a second end face; and
      one or more intermediate faces between said first and second end faces, said first and second end faces being distanced in such a way to leave a longitudinal aperture of the beam; and
   wherein at least one of the open beams includes a plurality of internal reinforcing flanges, the plurality of internal reinforcing flanges including:
      a closed frame structure with a central passage;
      a plurality of sides, each of the plurality of sides of each of the plurality of internal reinforcing flanges being substantially parallel to a corresponding side of the at least one open beam; and
      at least another leg traversing an open slot of the at least one open beam.

2. The modular structure according to claim 1, wherein said open beams are oriented in such a way that no face of any of said open beams is substantially horizontal.

3. The modular structure according to claim 1, wherein said plurality of internal reinforcing flanges include seats for accommodation of cables.

4. The modular structure according to claim 3, wherein said seats are formed as arc-shaped recesses of an inner face of at least one side of the flange.

5. The modular structure according to claim 1, wherein said plurality of internal reinforcing flanges include inward projections that define recesses for accommodation of cables.

6. The modular structure according to claim 1, wherein said open beams include end flanges for fixation of the beam to vertical elements of the structure.

7. The modular structure according to claim 1, wherein said vertical members and said horizontal beams form a lattice structure.

8. The modular structure according to claim 1, further comprising:
   a network of cables for distribution of power and signals, said network of cables running through said horizontal beams having said open polygonal cross section;
   wherein said horizontal beams hosting said network of cables form one or more horizontal layers in such a way that the resulting power and signal distribution network is arranged on one or more horizontal layers of the modular structure.

9. The modular structure according to claim 1, wherein:
   at least some of said vertical members are vertical corner members arranged at corners of the structure and are represented by cabinets adapted to contain pneumatic or electrical components of the packaging machine;

said horizontal beams include a first set of structural beams in a fixed position, said first set of structural beams includes at least an upper pair and a lower pair of substantially parallel longitudinal beams; and additional horizontal beams including a second set of beams having an adjustable position, said second set of beams including adjustable cross beams that can be removably arranged in different positions between said upper pair or between said lower pair of substantially parallel longitudinal beams.

10. The modular structure according to claim 9 wherein the adjustable cross beams of said second set of beams have wedge-shaped ends matching corresponding inclined faces of the respective longitudinal guide beams.

11. The modular structure according to claim 9, wherein at least some of the first set of structural beams include a prismatic connection member suitable for insertion of further transversal beams for a coupling of the module structure with another similar or identical module structure.

12. A packaging machine or a packaging line, for secondary packaging of articles into containers, comprising one or more modular structures according to claim 1.

\* \* \* \* \*